H. LENTZ.
VALVE ARRANGEMENT FOR CONTROLLING FLUID TRANSMISSION GEARS.
APPLICATION FILED SEPT. 1, 1909.

980,106.

Patented Dec. 27, 1910.

3 SHEETS—SHEET 1.

WITNESSES:
W. H. Berrigan
Alfred R. Anderson

INVENTOR,
HUGO LENTZ,
by H. van Oldenmel
Attorney.

H. LENTZ.
VALVE ARRANGEMENT FOR CONTROLLING FLUID TRANSMISSION GEARS.
APPLICATION FILED SEPT. 1, 1909.

980,106.

Patented Dec. 27, 1910.

WITNESSES:

INVENTOR,
HUGO LENTZ,
Attorney

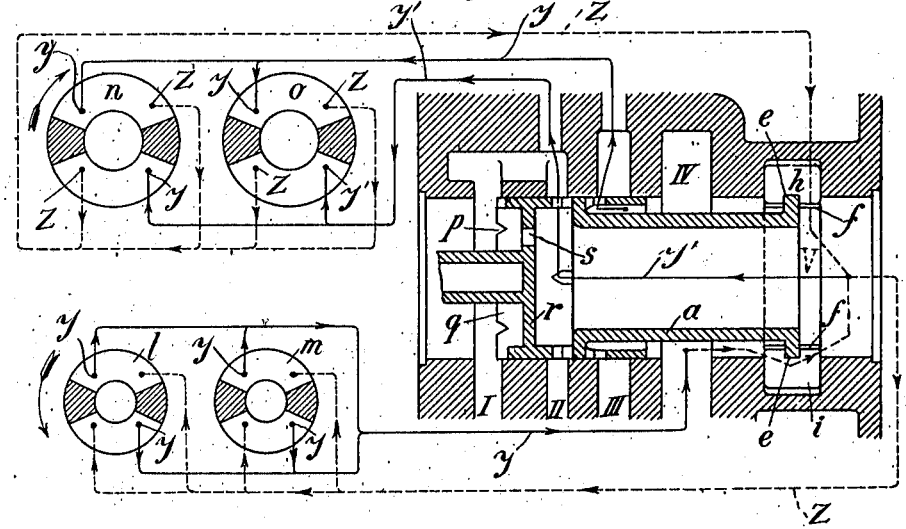
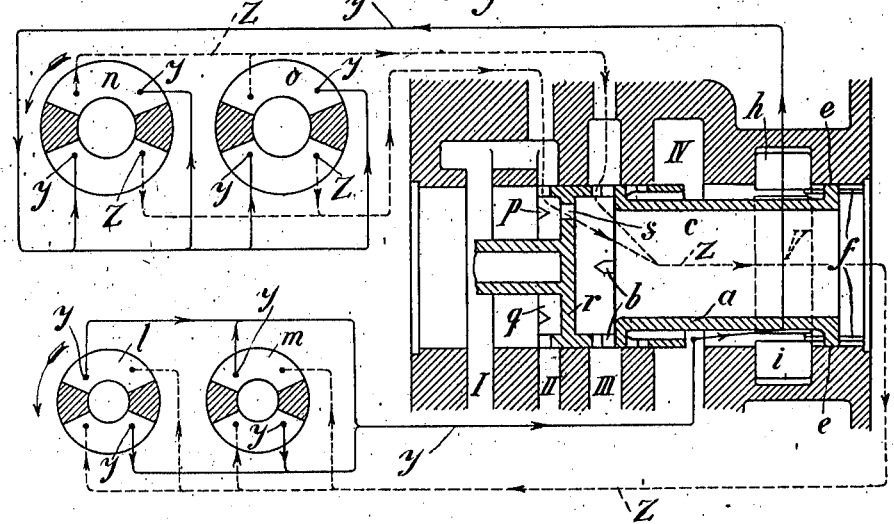

UNITED STATES PATENT OFFICE.

HUGO LENTZ, OF MANNHEIM, GERMANY.

VALVE ARRANGEMENT FOR CONTROLLING FLUID TRANSMISSION-GEARS.

980,106. Specification of Letters Patent. Patented Dec. 27, 1910.

Application filed September 1, 1909. Serial No. 515,704.

*To all whom it may concern:*

Be it known that I, HUGO LENTZ, a subject of the German Emperor, and residing at Mannheim, Germany, have invented a new and useful Valve Arrangement for Controlling Fluid Transmission-Gears; and I do hereby declare the following to be a full, clear, and exact description of the same.

The present invention relates to valve arrangements which permit the operation, at any desired speed, of one or more of the pressure-motors especially for driving a motor car, the braking of said motors, the stoppage of the same, or the reversal of direction of driving thereof.

In the accompanying drawings, I have shown a piston valve, useful for the purposes mentioned.

Figure 1:
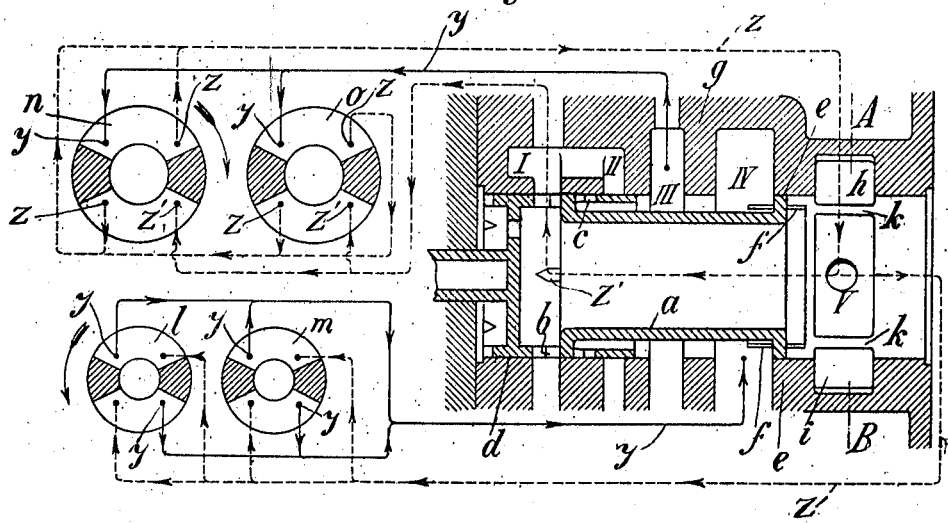
Figure 2:
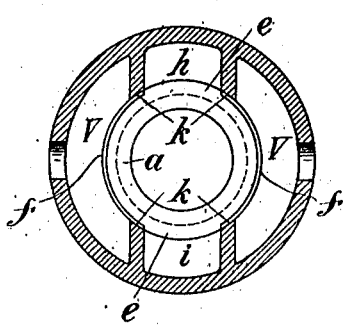
Figure 3:
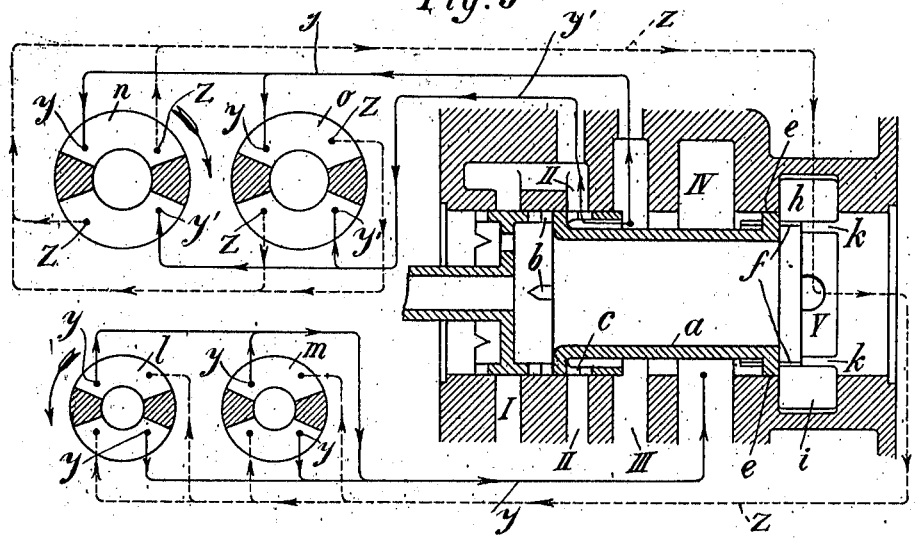
Figure 4:
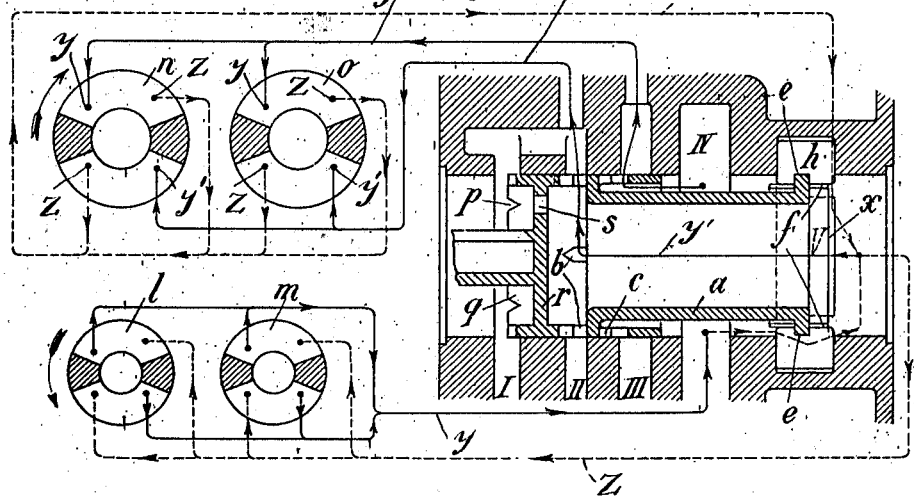

Figure 1 shows in section the valve and valve casing and also (diagrammatically) the pressure-pumps and the motors, the valve being in position to operate the pumps at high speed; Fig. 2 indicates a section at the line A—B of Fig. 1; Fig. 3 indicates the shifting of the valve to drive the motors at half speed; Fig. 4 indicates the position of the valve to brake the motors; Fig. 5 indicates the valve in position to cut out the motors; and Fig. 6 indicates the position of the valve to reverse the motors.

The valve has a hollow body $a$, is open at one end and, at the other end, is adapted to connect with a valve-rod (not shown). At one end, the valve has a broad working face, $d$ (Fig. 1) having a series of openings $b$ and second series $c$, the latter being formed in a flange, while the former communicate with the interior or chamber of the valve. At its other (the open) end, the piston valve is provided with flange having a working face ($e$) of small width, and segmental pieces ($f$, $f$, Fig. 2), of like diameter, are connected with said flange.

The valve-casing ($g$), which may be of any suitable construction, is shown as provided with ports, I, II, III, IV and V. In the last-named port (V), which is comparatively wide, two additional separate connecting chambers ($h$, $i$, Fig. 2) are formed, by means of bars $k$, for connecting opposite sides of the working face of the valve. The segmental pieces, $f$, when the valve is in a desired position, close the passage V with the exception of the connecting chambers $h$ and $i$.

The valve is adapted to be shifted lengthwise of its casing. In one position (Fig. 1), the port I is in communication (by openings $b$) with the interior of the valve, the port II is closed by the broad flange, while the ports III, IV and V are uninterrupted. In another position (Fig. 3), the port I is closed and the port II is opened by communication with the opening $c$ of the broad flange.

The primary pumps, of any suitable construction, are shown at $l$ and $m$, and the motors are shown at $n$ and $o$.

In the first position of the valve (that of Fig. 1), the transmission fluid is forced by the primary pumps into the pressure port IV, passes to port III, and thence to the motors $n$ and $o$, which thus run single acting. The course of the liquid is indicated in the drawings in full lines $y$. Fluid escaping from the motors, along the dotted line $z$ is conveyed to the return port V, a small part $z'$ of it being drawn out through apertures $b$ and the port I (the second inlet of the motors), so that no back-pressure on the pump piston is caused.

When the valve is pushed into the position shown in Fig. 3, a portion of the pressure fluid also passes through the aperture $c$ into the port II and thus reaches the second inlet $y'$ in the motors. The circulation produced in the first position of the valve by the motors, is interrupted as the apertures $b$ are covered. The motors now run at half speed, because the quantity of pressure fluid is divided and comes into operation at two places $y$ and $y'$.

In the third position of the piston valve $a$ (Fig. 4), the fluid follows the same course $y$, $y'$ as in the previous position, but after quitting the motors and on passing through the passage V it $z$ is throttled, as only a narrow slot $x$ remains open in consequence of the position of the segmental pieces $f$. The consequence of this throttling is that the return pipe is completely filled, and the motors can only rotate slowly, which action is equivalent to braking.

On the closing of the passage V (Fig. 5) the return pipe $z$ is closed to the fluid, whereby the motors and thus the rear wheels of the car are entirely locked. The quantity of pressure fluid delivered by the primary pumps is enabled to describe a closed course by means of the separate connecting chambers $h$ and $i$ formed in the port V.

The position of the valve, for reversing the motors, is shown in Fig. 6. The connection between the chambers h and i and the return pipe is interrupted by the end e of the valve, so that the fluid y is forced to flow through the port V to the motors. The functions of the pressure pipe and the suction pipe have thus been interchanged, whereby the pistons of the motors are caused to rotate in the opposite direction. After quitting the motors, a portion z of the fluid comes into the passage II and from here through the notches p into the left hand hollow chamber q of the valve a from whence it flows through the apertures s provided in the vertical wall r into the right hand chamber of the valve and thus to the primary pumps; another portion z of the fluid flows through the passage III and the openings b to the primary pumps.

What I claim is:

1. In a device for controlling the speed, braking, and reversing of motors, the combination with the motors of a valve casing provided with ports connected with the motors, a hollow piston valve, open at one end and having working faces at each end, slidably mounted in said casing, the working face at the open end being provided with segmental pieces for throttling a port of the casing, the working face of the valve at the closed end having openings for connecting the hollow interior of the valve with a port of the casing, and also having openings for connecting the exterior of the valve with a port in the casing.

2. A hollow piston valve open at one end, said end having a working face provided with segmental pieces, the closed end of the valve having a working face, and a flange over-hanging the exterior of the valve, openings being provided in the last-mentioned working face and in the flange.

In testimony whereof, I have signed my name to this specification in the presence of two subscribing witnesses.

HUGO LENTZ.

Witnesses:
C. FRANZ,
ERNEST L. IVES.